Aug. 4, 1970 G. H. LLOYD 3,522,521

REFERENCE VOLTAGE CIRCUITS

Filed Sept. 27, 1966 2 Sheets-Sheet 1

George Howard Lloyd Inventor

By Dowell & Dowell Attorneys

Inventor
George Howard Lloyd
By
Dowell & Dowell
Attorneys

United States Patent Office 3,522,521
Patented Aug. 4, 1970

3,522,521

REFERENCE VOLTAGE CIRCUITS

George Howard Lloyd, Hertfordshire, England, assignor to Hawker Siddeley Dynamics Limited, Hertfordshire, England Filed Sept. 27, 1966, Ser. No. 582,456
Claims priority, application Great Britain, Nov. 4, 1965, 46,839/65
Int. Cl. G05f *1/58*
U.S. Cl. 323—22 7 Claims

ABSTRACT OF THE DISCLOSURE

A reference voltage circuit for regulating the low voltage D.C. supply consists of two circuit branches each including a transistor and impedances in series, which two circuit branches are connected across the supply terminals in parallel with one another. The transistor in each circuit branch has its base connected to a junction point in the other branch and the two transistors are of opposite conductivity type. There is thus set up a positive feedback loop but this does not cause oscillation because the gain is arranged to be less than one. Temperature compensating diodes are connected in series in both circuit branches.

This invention relates to reference voltage circuits.

Electrical circuits for regulating a D.C. supply voltage, so as to provide a substantially constant output voltage despite input voltage variations, commonly make use of voltage breakdown-type reference elements such as Zener diodes or neon lamps which require to be fed with current. It is an object of this invention to provide a voltage regulating circuit, suitable for low voltage D.C. lines, which relies on a reference element of this type but is generally simpler and less expensive than circuits employed hitherto while maintaining excellent attenuation of supply voltages variations.

According to the present invention, a reference element of the type referred to is employed in a reference voltage circuit in an arrangement such that said reference element wholly or in part stabilises its own current. More particularly, the reference element may be disposed in a positive feedback loop having a gain of less than unity so that it does not oscillate.

In the preferred form, the circuit comprises a resistance, a transistor and a reference element of the type referred to connected in series circuit across D.C. supply terminals, D.C. output terminals connected to opposite poles of the reference element, and a second resistance, a transistor and a third resistance connected in a second series circuit, parallel with the first, across the D.C. supply terminals, the base of the transistor in the first circuit being connected or coupled to the junction between the second resistance and the transistor in the second circuit, and the base of the transistor in the second circuit being connected to the junction between the transistor and the reference element in the first circuit.

Examples of circuits in accordance with the invention will now be described with reference to the accompanying drawings, in which.

A reference element such as a Zener diode or neon lamp, when operating can be considered as a voltage generator in series with an impedance whose main component is resistive at low frequencies. Any change in current through the reference element produces a change in voltage across the reference element due to the series resistance. The purpose of the circuits to be described is to stabilize the current flowing through the reference element against changes in temperature, time and input voltage variations. The circuits use the reference element wholly or partly to stabilize its own current.

Figure 1:
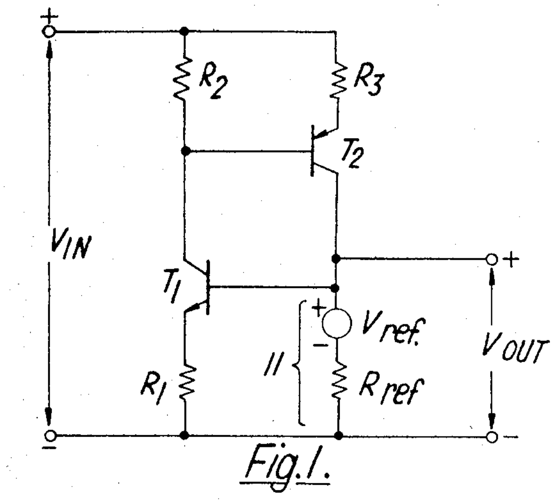
FIG. 1 is a circuit illustrating the principle of the invention.

The basic circuit, as achieved by transistor circuitry, is illustrated in FIG. 1. The circuit diagram shows how the reference element is used to stabilise the current through itself. Assume that the reference element 11 has current passing through it, hence it develops a voltage $V_{out}$ across it. This voltage causes a current to flow in the collector of transistor $T_1$ determined by the resistor $R_1$. The collector current then produces a voltage across the resistor $R_2$ proportional to the current. The voltage across resistor $R_2$ causes a current to flow in the collector of transistor $T_2$ which is proportional to the value of resistor $R_3$. Thus current then feeds the reference element 11 thus completing the loop. The currents are well stabilised if the voltage drops across the resistors are large compared with any change in voltage occurring across the transistor emitter-to-base junctions.

Figure 2:
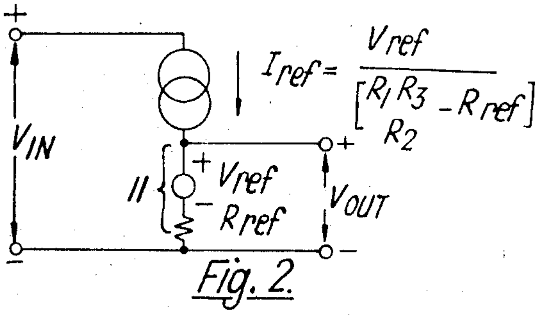
FIG. 2 is an equivalent circuit of FIG. 1.

Assuming that the transistors are perfect in that they have infinite gain and output impedance, and also zero emitter-to-base voltage drops, then the current $I_{ref}$ which flows through the reference element 11 is given by:

$$I_{ref}=\frac{V_{ref}}{\left(\frac{R_1R_3}{R_2}-R_{ref}\right)}$$

where $V_{ref}$ is the voltage of the reference element and $R_{ref}$ its internal resistance; and has an equivalent circuit as shown in FIG. 2.

Since the reference element is fed from a current source its output voltage $V_{out}$ is substantially independent of $V_{in}$, i.e., the supply voltage variations.

Figure 3:
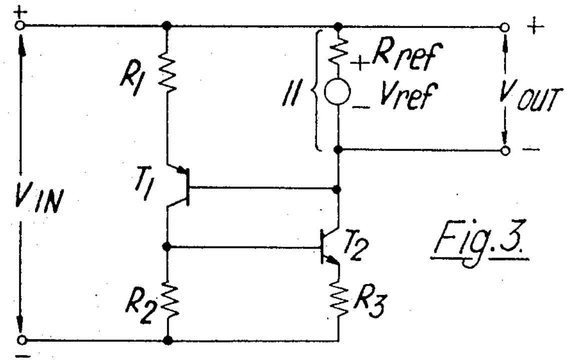
FIG. 3 is a circuit corresponding to that of FIG. 1 but adapted for reversed polarities.

The circuit can easily be converted to operate from a negative voltage supply as shown in FIG. 3.

The collector output impedances of the transistors shunt the current generator and form, together with the internal resistance of the reference element, a voltage divider for variations of the supply voltage $V_{in}$. Since the output impedances of the transistors are high compared with the internal resistance of the reference element the effects of moderate changed in $V_{in}$ on $V_{out}$ are small.

The collector output impedances are increased for reduced base impedances and the output impedance of transistor $T_2$ could be increased by replacing resistor $R_2$ with a reference element; this however, would mean the use of two reference elements instead of one.

The circuits as shown in FIG. 1 and FIG. 3 might not attain the equilibrium state when $V_{in}$ is switched on if low leakage transistors are used and there is a load on the reference element. One method of switching the circuit on automatically, and also resetting automatically if the reference element is shorted out, is to connect across transistor $T_1$ (or $T_2$) a Zener diode whose voltage break-down value is greater than the maximum collector-to-emitter voltage which the transistor will experience in the normal working condition but less than $V_{in}$. In the normal condition the shunt resistance due to this Zener diode is very high with a suitably chosen Zener.

Figure 4:
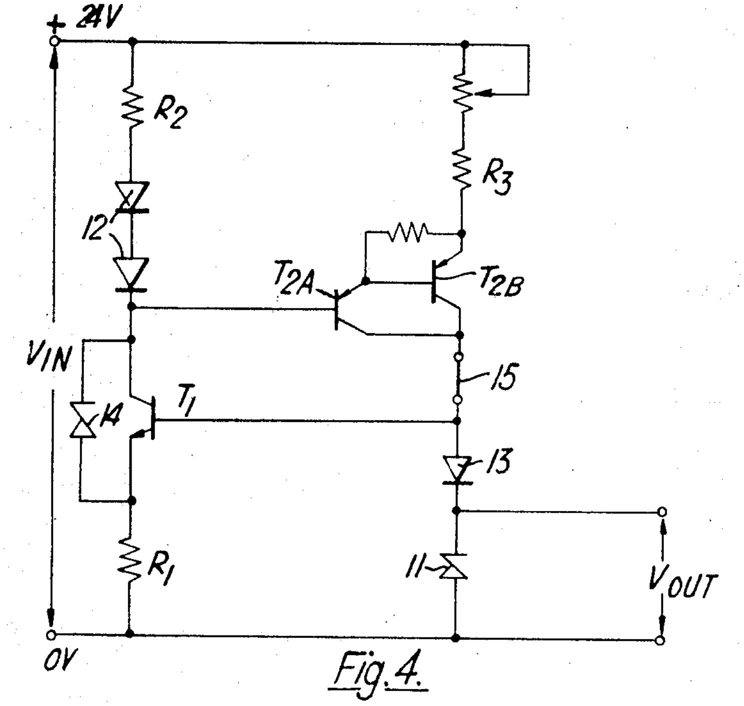
FIG. 4 is a practical version of the circuit of FIG. 1.

The emitter-base junction drive voltages of the transistors are dependent upon temperature. This variation with temperature can be partially compensated by the insertion of diodes. A practical circuit is shown in FIG. 4 for a transistorised reference voltage supply including compensating diodes 12, 13. In this circuit a second Zener diode 14 has been placed in shunt across the transistor $T_1$, for the purpose already described, and the transistor $T_2$ has become a pair of transistors $T_{2A}$, $T_{2B}$.

Temperature coefficients of 40 $\mu$v. per degree centigrade over a temperature range of 25° C. to 80° C. have been recorded with the circuit of FIG. 4. A change in $V_{in}$ from two volts above nominal to two volts below nominal produced less than 1 mv. change in $V_{out}$, indicating a reduction of supply variations in the ratio of greater than 4000:1. The temperature and long term stability of the circuit are ensured by the use of planar semiconductor components where possible, and high quality precision wirewound resistors with low temperature coefficients.

If desired, a further improvement in temperature stability can be obtained by temperature controlling the semiconductor components.

If a load is required in the form of a resistor or resistance chain across the reference element 11 the current in the reference element can be kept at its optimum value and the current required by the load also be supplied by suitably adjusting the value of the resistor $R_3$. The circuit has the advantage that the voltage divider ratio for the supply rail variations (for a fixed nominal supply) does not decrease directly in proportion to the increase in the combined current of the load and reference element but at a lower rate.

Figure 5:
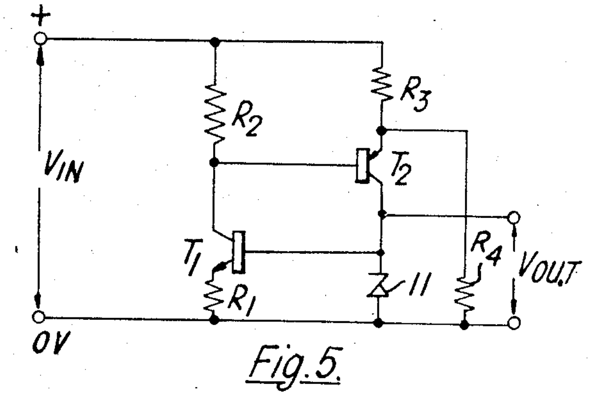
FIG. 5 shows a modification of the circuit of FIG. 1.

FIG. 5 shows a circuit similar to that of FIG. 1 with the addition of a further resistor $R_4$ across the transistor $T_2$ and reference element 11.

This makes it possible to attain near infinite attenuation of input variations by suitable choice of the resistor $R_4$. The resistor $R_4$ bypasses the change in current in resistor $R_3$ caused by variations in $V_{in}$. For circuits of this type attenuations of 120 dbs have been achieved for one volt RMS input variations. The same technique can be employed in the circuits of FIGS. 1 and 3.

I claim:

1. A reference voltage circuit, comprising a resistance, a transistor and a reference element of the voltage breakdown type connected in series circuit across D.C. supply terminals; D.C. output terminals connected to opposite poles of the reference element; a second resistance, a transistor and a third resistance connected in a second series circuit, parallel with the first, across the D.C. supply terminals; the base of the transistor in the first circuit being connected or coupled to the junction between the second resistance and the transistor in the second circuit, and the base of the transistor in the second circuit being connected to the junction between the transistor and the reference element in the first circuit.

2. A circuit according to claim 1, wherein the reference element is a Zener diode.

3. A circuit according to claim 1, wherein the transistors are of opposite conductivity type.

4. A circuit according to claim 2, wherein a second Zener diode is connected in shunt across the transistor in said second series circuit.

5. A circuit according to claim 1, including first temperature-compensating diode means connected in series in said first series circuit and second temperature-compensating diode means connected in series in said second series circuit.

6. A circuit according to claim 1, wherein a further resistor is connected in shunt across the reference element and transistor in the first series circuit.

7. A circuit according to claim 1, wherein the two series circuits provide a positive feedback loop including the reference element, said feedback loop having a gain of less than unity.

References Cited

UNITED STATES PATENTS

| | | | |
|---|---|---|---|
| 2,991,407 | 7/1961 | Murphy | 323—4 |
| 3,007,102 | 10/1961 | Kennedy. | |
| 3,217,237 | 11/1965 | Giger. | |
| 3,246,233 | 4/1966 | Herz | 323—4 |
| 3,255,402 | 6/1966 | Vollnhals. | |
| 3,303,413 | 2/1967 | Warner et al. | 323—4 |

FOREIGN PATENTS

| | | |
|---|---|---|
| 1,297,773 | 5/1962 | France. |

J. D. MILLER, Primary Examiner

A. D. PELLINEN, Assistant Examiner

U.S. Cl. X.R.

323—38